F. P. JACKMAN.
NEEDLE THREADER.
APPLICATION FILED MAR. 15, 1918.
1,306,668. Patented June 10, 1919.
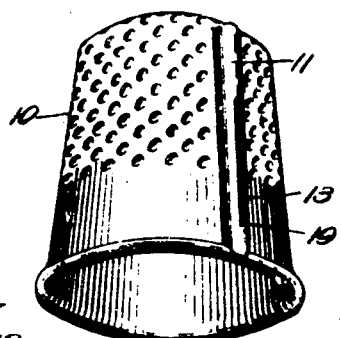
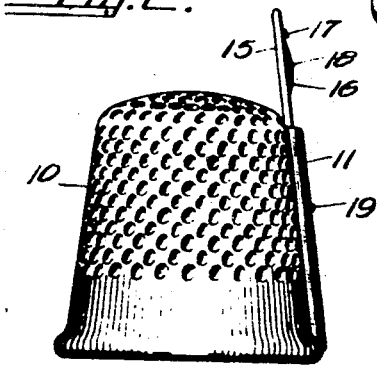
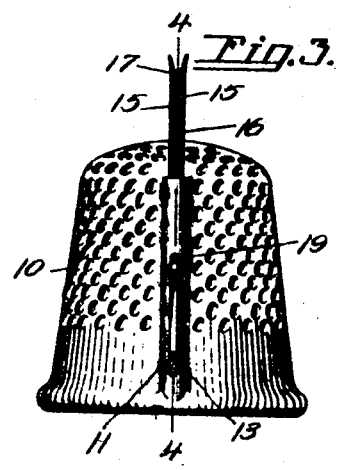
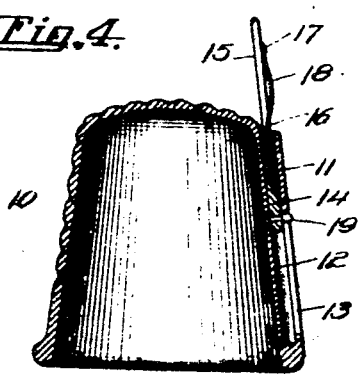
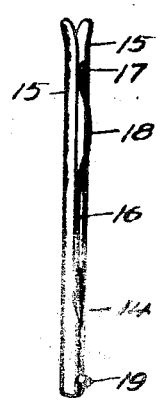
Witnesses.
F. C. Gibson.
T. L. Mockabee
Inventor
F. P. Jackman.
By Victor J. Evans
Attorney

UNITED STATES PATENT OFFICE.

FRANKLIN P. JACKMAN, OF PORTLAND, OREGON.

NEEDLE-THREADER.

1,306,668.

Specification of Letters Patent. Patented June 10, 1919.

Application filed March 15, 1918. Serial No. 222,700.

*To all whom it may concern:*

Be it known that I, FRANKLIN P. JACKMAN, a citizen of the United States, residing at Portland, in the county of Multnomah and State of Oregon, have invented new and useful Improvements in Needle-Threaders, of which the following is a specification.

This invention relates to devices for threading needles and aims to provide means carried by a thimble for this purpose, so that the device will be at all times convenient for use.

The novelty of the invention resides with a particular construction of the threader and manner of housing it within a pocket formed on or carried by the thimble, so that it will not interfere with the use of the latter, the construction of the threader permitting of its being completely housed within the minimum amount of space without leaving any projecting parts to catch in the thread, yet being readily accessible when its use is desired.

Other objects and advantages of the invention will appear when the following description is read in connection with the accompanying drawings, in which:—

Figure 1 is a perspective view of a thimble having the improved threader adapted thereto;

Fig. 2 is an elevation of the same with the threader extended in position for use;

Fig. 3 is a view similar to Fig. 2, but looking at the device at right angles to the said figure;

Fig. 4 is a sectional view on the line 4—4 of Fig. 3 on an enlarged scale; and

Fig. 5 is a perspective view of the threading device detached from the thimble.

In the practical embodiment of the invention as herein shown and described, the threader is shown in connection with a thimble of the usual size and is preferably of the same length.

The thimble shown in the present instance is indicated by the reference character 10 and has formed on or secured thereto in any desired manner, a longitudinally extending rib or projection 11, which latter is formed with a longitudinally extending bore, forming a pocket 12 open at its upper end and closed at its lower end. The pocket 12 is provided upon its outer side with a longitudinal slot 13, which extends from a point adjacent the lower end of the socket, to a point adjacent the upper end.

Slidably mounted within the pocket 12 is a needle threading device, preferably formed with a base 14 having a bifurcated portion extending therefrom in the form of spaced parallel guards 15, whose free ends curve outwardly in opposite directions. Secured to the base 14 between the guards 15, is a shank 16 of a threading hook 17, the said hook being formed upon the free end of the shank and projecting laterally beyond the outer faces of the guards 15. The free end of the hook extends downwardly toward the open end of the thimble, so that when inserted through the eye of the needle, a thread may be placed transversely across the guards 15 below the hook, when the removal of the hook in the eye of the needle will pull the thread through the eye. In order to depress the hook 17 within the space between the guards 15, so to to prevent the hook from striking the open edge of the pocket 12, the shank 16 of the hook is formed with a curved or bowed portion 18, the latter being located adjacent the hook, so that contact of this bowed portion with the edge of the pocket will depress the hook to permit of its entrance into the pocket.

Carried by the shank 14 is a stud or projection 19, which extends through the slot 13 and acts as a guide for the threader. In addition it provides means for the manipulation of the threader, permitting of its being conveniently slid into and out of the pocket 12 when desired.

It is believed that when the foregoing description is read in connection with the accompanying drawings, that the construction, operation and advantages of the invention will be apparent. The right is reserved to make such changes in the form and proportions of the invention as will fall within the scope of the appended claims.

Having described the invention, what is claimed is:—

1. A needle threader comprising an elongated open ended pocket, a bifurcated member slidably mounted within said pocket and a spring hook member positioned within said bifurcated member and engageable with the inner wall of the pocket.

2. A needle threader comprising an elongated open ended pocket, a bifurcated member slidably mounted within said pocket, a spring hook member positioned within said bifurcated member and engageable with the inner wall of the pocket and a pin carried by the bifurcated member to operate through a slot in the pocket.

3. A needle threader comprising an elongated open ended pocket, a bifurcated member slidably mounted within said pocket, a hook member positioned within and projecting laterally from one side of the bifurcated member and a curved portion formed on the shank of the hook member for contact with the edge of the pocket to depress the hook member for entrance into the pocket.

In testimony whereof I affix my signature.

FRANKLIN P. JACKMAN.